US010011022B1

(12) United States Patent
Lin et al.

(10) Patent No.: US 10,011,022 B1
(45) Date of Patent: Jul. 3, 2018

(54) ROBOTIC SYSTEM WITH RECONFIGURABLE END-EFFECTOR ASSEMBLY

(71) Applicant: GM GLOBAL TECHNOLOGY OPERATIONS LLC, Detroit, MI (US)

(72) Inventors: Yhu-tin Lin, Rochester Hills, MI (US); Dooil Hwang, Rochester Hills, MI (US); Maurice Perlman, Oak Park, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/440,471

(22) Filed: Feb. 23, 2017

(51) Int. Cl.
*B25J 15/00* (2006.01)
*B25J 9/10* (2006.01)
*B25J 15/06* (2006.01)

(52) U.S. Cl.
CPC ......... *B25J 15/0061* (2013.01); *B25J 9/1005* (2013.01); *B25J 15/0616* (2013.01)

(58) Field of Classification Search
CPC ............... B25J 15/0061; B25J 15/0052; B25J 15/0616; B25J 9/04; B25J 9/1005; B65G 47/91; Y10S 901/40; Y10S 901/14; Y10S 901/23; Y10S 901/30; Y10S 901/19
See application file for complete search history.

(56) References Cited

U.S. PATENT DOCUMENTS

| 7,575,408 | B2 * | 8/2009 | Tominaga | B25J 15/0052 414/222.04 |
| 8,172,210 | B2 * | 5/2012 | Jeon | B25J 15/0061 269/21 |
| 8,857,877 | B2 | 10/2014 | Lin et al. | |
| 2009/0035107 | A1 * | 2/2009 | Duran | B25J 5/02 414/426 |
| 2009/0194922 | A1 * | 8/2009 | Lin | B25J 15/0052 269/55 |
| 2010/0140969 | A1 * | 6/2010 | Lin | B25J 15/0052 294/86.4 |
| 2015/0336221 | A1 | 11/2015 | McKay | |
| 2015/0336271 | A1 | 11/2015 | Spicer et al. | |
| 2016/0346865 | A1 | 12/2016 | Sigler et al. | |

* cited by examiner

*Primary Examiner* — Stephen A Vu

(57) ABSTRACT

An end-effector assembly includes a master boom, a frame rail coupled to the master boom, at least one branch rail movably coupled to the frame rail by a branch lock, and a swing arm movably coupled to the at least one branch rail by a swing lock. The swing lock includes a clamp configured to movably secure the swing arm to the branch rail. A pivot shaft extends through the clamp and the swing arm and is configured to rotationally secure the swing arm to the clamp. A swing plate is secured to the pivot shaft and is configured for engagement with a configuration tool. Further, a locking fastener extends through the swing plate and into the pivot shaft. The locking fastener is configured to lock and unlock the swing lock in position along the branch rail.

17 Claims, 8 Drawing Sheets

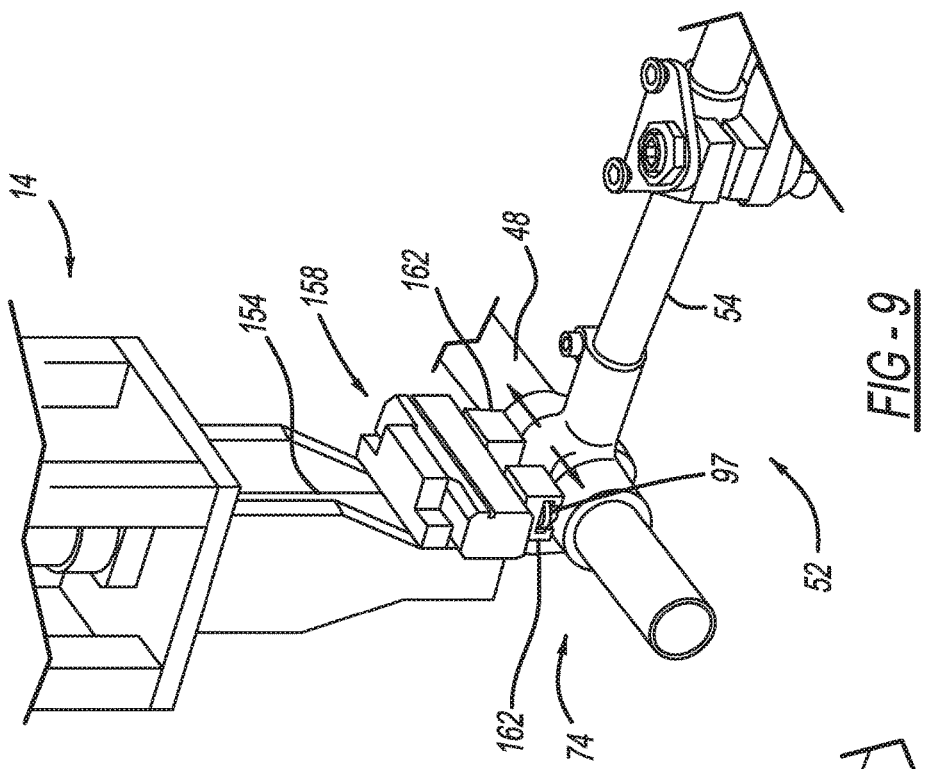
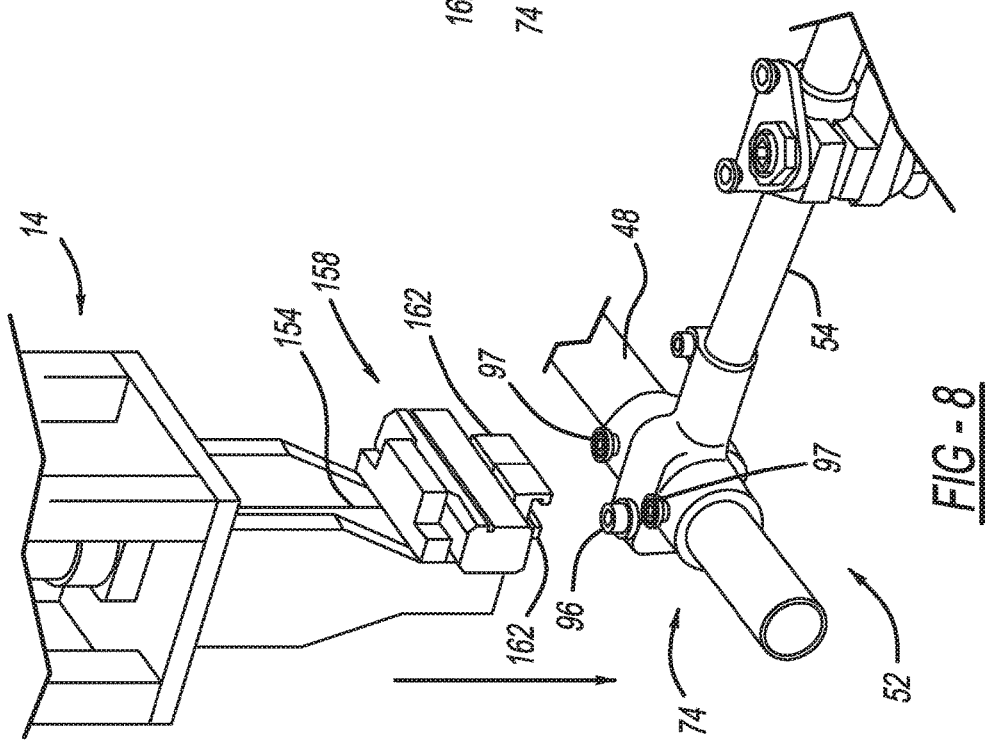

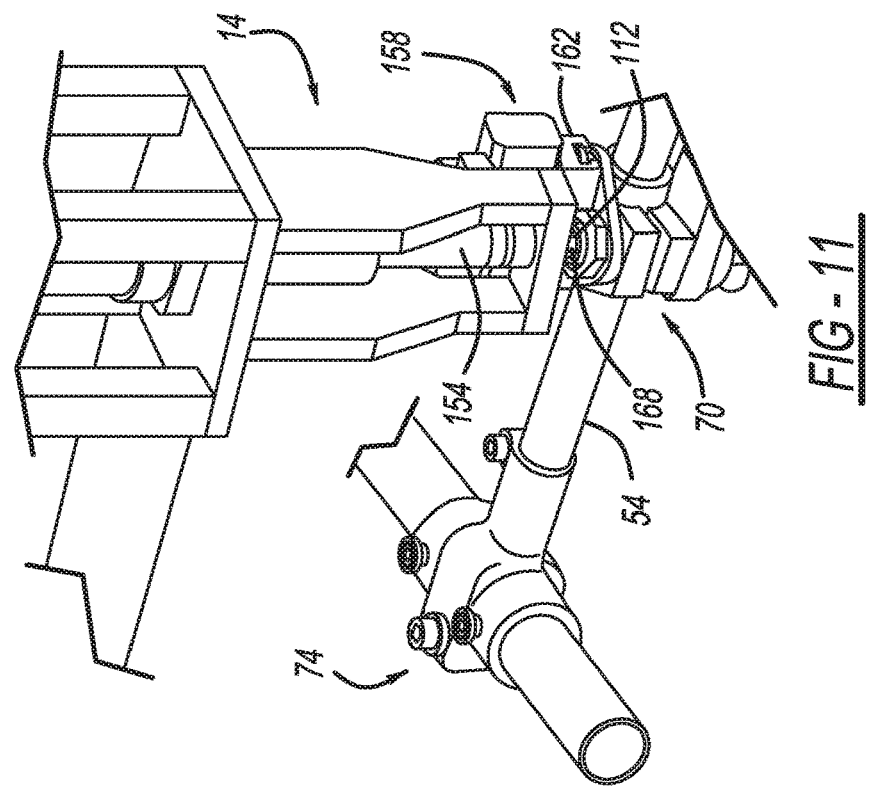
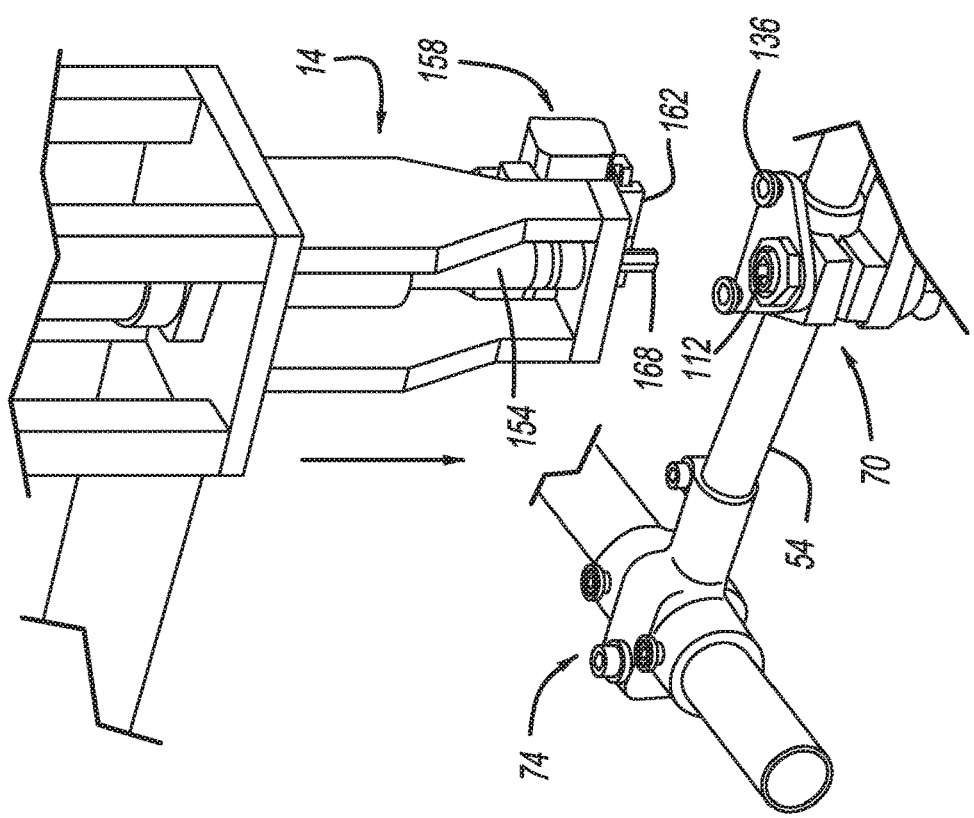

006 # ROBOTIC SYSTEM WITH RECONFIGURABLE END-EFFECTOR ASSEMBLY

FIELD

The present disclosure relates to a robotic system with a reconfigurable end-effector assembly.

INTRODUCTION

The statements in this section merely provide background information related to the present disclosure and may not constitute prior art.

Multi-axis industrial robots include articulated arms connected via joints. Each arm segment is driven via one or more joint motors. Typical industrial robots are controlled with respect to six different control axes. Collectively, the control axes enable rotation of the robot with respect to a fixed or mobile base, extension/retraction of a first arm, and raising/lowering of a second arm, as well as joint rotation and rotation/translation of a wrist disposed at a distal end of the second arm. Additional arms may be used in a serial arrangement depending on the design and an end-effector connected to the wrist may be manipulated to perform a desired work task.

The term "end-effector" refers to the particular end linkages or segments that, depending on the design of the robot, can securely grip, transport, orient, and release a workpiece. Certain end-effector assemblies are formed via a latticed array of elongated beams and/or rails to which are attached a set of tool branches suspended with end tools (e.g., suction cups or grippers of the type used for moving metal panels or panes of glass in a manufacturing facility). The individual tool branches and tool modules traditionally are manually adjusted by an operator to a predetermined configuration prior to performing a specified work task.

SUMMARY

An end-effector assembly includes a master boom, a frame rail coupled to the master boom, at least one branch rail movably coupled to the frame rail by a branch lock, and a swing arm movably coupled to the at least one branch rail by a swing lock. The swing lock includes a clamp configured to movably secure the swing arm to the branch rail. A pivot shaft extends through the clamp and the swing arm and is configured to rotationally secure the swing arm to the clamp. A swing plate is secured to the pivot shaft and is configured for engagement with a configuration tool. Further, a locking fastener extends through the swing plate and into the pivot shaft. The locking fastener is configured to lock and unlock the swing lock in position along the branch rail.

In some embodiments of the end-effector assembly, the branch lock is movable relative to the frame rail between an unlocked and a locked state so as to fix the branch rail in position relative to the frame rail. Furthermore, the swing lock is rotationally and linearly movable along the branch rail between an unlocked and a locked state so as to fix the swing arm in position relative to the branch rail. Additionally, the end-effector assembly further comprises an end tool arranged at a distal end of the swing arm, the end tool defining a first side of the end-effector assembly for engagement with a workpiece. The branch lock and the swing lock are configured to be engaged by the configuration tool on a second side of the end-effector assembly opposite to the first side. Furthermore, the clamp further defines a protrusion on an end face and the swing arm defines a correspondingly-shaped recess, and wherein the protrusion and the recess are matingly joined when the locking fastener is locked. Additionally, a retaining ring may be secured within the swing plate and configured to retain the locking fastener therein. The retaining ring traps the locking fastener to assist in releasing the protrusion from the recess. The swing lock may also include at least one over-stretch limiting device having at least one over-stretch fastener secured within the clamp for restraining the clamp during unlock of the swing lock.

A swing lock assembly for an end-effector includes a clamp configured to movably secure a swing arm to a branch rail. The clamp includes an arm portion and a base portion having a protrusion on an end face thereof. The swing arm has a recess correspondingly shaped with the protrusion. A pivot shaft extends through the arm and base portions of the clamp and is configured to rotationally secure the swing arm to the clamp. A swing plate is arranged on the arm portion of the clamp and is keyed to the pivot shaft. The swing plate includes at least one tab configured for engagement with a configuration tool. A locking fastener extends through the swing plate and into the pivot shaft. The locking fastener is configured to lock and unlock the swing lock assembly in position along the branch rail, and the protrusion and the recess are matingly joined when the locking fastener is locked.

In some embodiments, the swing lock assembly also includes a retaining ring secured within the swing plate and configured to retain the locking fastener therein. The retaining ring traps the locking fastener to assist in releasing the protrusion from the recess. Furthermore, the swing lock is rotationally and linearly movable along the branch rail between an unlocked and a locked state so as to fix the swing arm in position relative to the branch rail. Additionally, the swing lock assembly may also include an end tool arranged at a distal end of the swing arm. The end tool defines a first side of the end-effector. The swing lock assembly is configured to be engaged by the configuration tool on a second side of the end-effector opposing the first side. The swing lock assembly may also include at least one over-stretch limiting device having at least one over-stretch fastener secured between the arm portion and the base portion of the clamp for restraining the clamp during unlock of the locking fastener.

The configuration tool usable with the swing lock assembly may include a tool body, a gripper coupled to the tool body, and a driver bit extending from the tool body. The gripper includes a plurality of gripper fingers movable toward and away from each other. The configuration tool is coupled to the swing lock assembly when the gripper fingers engage the at least one tab. Furthermore, the driver bit is aligned with the locking fastener when the gripper fingers engage the at least one tab such that rotating the driver bit causes the swing lock assembly to move between the locked and unlocked states.

A swing lock assembly for an end-effector includes a clamp configured to secure a swing arm to a branch rail. The clamp has a first surface and an opposing second surface. A pivot shaft extends through the clamp and the swing arm in order to rotationally secure the swing arm to the clamp. The pivot shaft has a flange arranged at the second surface of the clamp. A swing plate is arranged on the first surface of the clamp and is keyed to the pivot shaft. The swing plate includes at least one tab configured for engagement with a configuration tool. A locking fastener extends through the swing plate and into the pivot shaft. The locking fastener is configured to move the swing plate and the flange toward each other in order to lock the swing lock assembly in position along the branch rail and away from each other in order to unlock the swing lock assembly from position along the branch rail.

In some embodiments, the swing lock assembly is rotationally and linearly movable along the branch rail between an unlocked and a locked state so as to fix the swing arm in position relative to the branch rail. Additionally, the swing lock assembly may also include an end tool arranged at a distal end of the swing arm. The end tool defines a first side of the end-effector. The swing lock assembly is configured to be engaged by the configuration tool on a second side of the end-effector opposing the first side. Furthermore, the pivot shaft may be keyed for rotational movement with the swing arm.

The configuration tool usable with the swing lock assembly may include a tool body, a gripper coupled to the tool body, and a driver bit extending from the tool body. The gripper includes a plurality of gripper fingers movable toward and away from each other. The configuration tool is coupled to the swing lock assembly when the gripper fingers engage the at least one tab. Furthermore, the driver bit is aligned with the locking fastener when the gripper fingers engage the at least one tab such that rotating the driver bit causes the swing lock assembly to move between the locked and unlocked states.

In still other embodiments, a robot has an end-effector including the swing lock assembly as described above.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 8 is a perspective view of the configuration tool moving toward a branch lock of the end-effector assembly;

FIG. 9 is a perspective view of the configuration tool coupled to the branch lock of the end-effector assembly;

FIG. 10 is a perspective view of the configuration tool moving toward a swing lock of the end-effector assembly;

FIG. 11 is a perspective view of the configuration tool coupled to the swing lock of the end-effector assembly.

DETAILED DESCRIPTION

Figure 1:
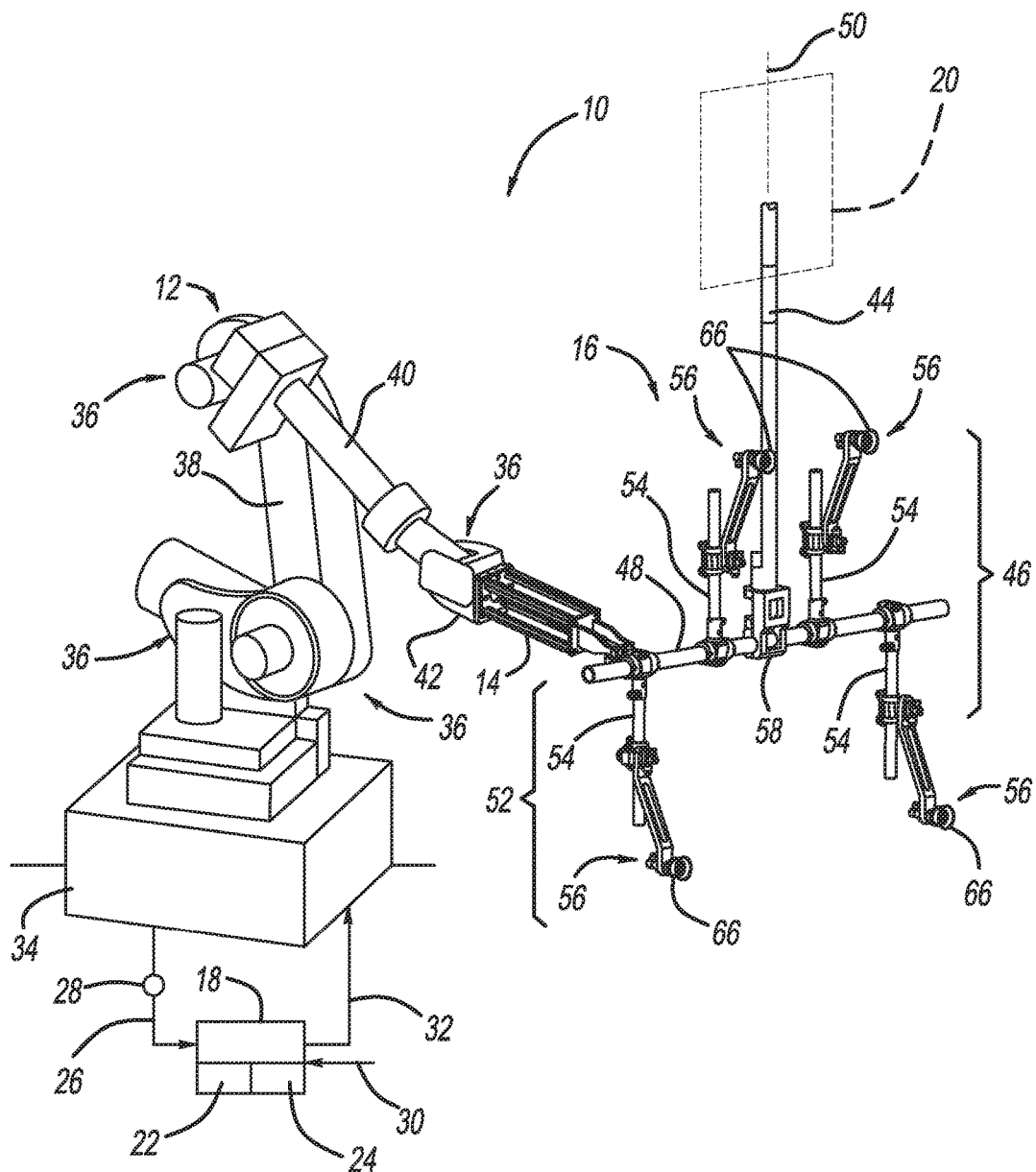
FIG. 1 is a perspective view of a robotic system including an end-effector assembly according to the present disclosure.

The following description is merely exemplary in nature and is not intended to limit the present disclosure, application, or uses. It should be understood that throughout the drawings, corresponding reference numerals indicate like or corresponding parts and features. Further, directions such as "top," "side," "back", "lower," and "upper" are used for purposes of explanation and are not intended to require specific orientations unless otherwise stated. These directions are merely provided as a frame of reference with respect to the examples provided, but could be altered in alternate applications.

Referring to the drawings, wherein like reference numbers refer to like components throughout the several figures, a robotic system 10 is shown schematically in FIG. 1. The robotic system 10 includes a multi-axis industrial robot 12, a configuration tool 14, and a reconfigurable end-effector assembly 16 described in detail below. Overall operational control of the robotic system 10 may be achieved via a controller 18. The robotic system 10 also includes a configuration stand 20, as will be discussed in greater detail below.

The controller 18 may be configured as a host machine (e.g., a digital computer), which is specially programmed to execute steps or instructions. To that end, the controller 18 includes sufficient hardware to perform the required method steps, i.e., with sufficient memory 22, a processor 24, and other associated hardware such as a high-speed clock, analog-to-digital and/or digital-to-analog circuitry, a timer, input/output circuitry and associated devices, signal conditioning and/or signal buffering circuitry. The memory 22 includes sufficient tangible, non-transitory memory such as magnetic or optical read-only memory, flash memory, etc., as well as random access memory, electrically erasable programmable read only memory, and the like. The controller 18 receives and records the measured joint positions (arrow 26) from at least one position sensor 28, and also monitors forces applied by or to the end-effector assembly 16 in the course of configuring the end-effector assembly 16, as well as, while operating on a given workpiece (not shown). The controller 18 generates or receives input signals (arrow 30) informing the controller 18 as to the required work task(s) to perform on the corresponding workpiece(s) and outputs control signals (arrow 32) to the robot 12 to command the required actions from the robot 12.

The robot 12 may be configured as a 6-axis industrial robot and may include a fixed or mobile base 34 and a plurality of robotic joints 36, at least some of which are shown in FIG. 1. The various joints 36 connect segments or serial linkages of the robot 12, including a first or lower robotic arm 38, a second or upper robotic arm 40, and a wrist 42, which collectively provide the desired range of motion and number of control degrees of freedom needed for performing assigned work tasks. It is contemplated that the robot 12 may include more or fewer robotic arms and wrists. Examples of such work tasks performed by the robot 12 include the grasping, lifting, locating, and placement of panels of metal or glass panes, along with a host of other possible tasks, such as painting and welding. Joint position sensors 28 may be positioned with respect to each joint 36 and configured to measure and report the measured joint positions (arrow 26) to the controller 18, as previously discussed. Additionally, one or more force sensors (not shown) may also be positioned with respect to the joints 36 and used to provide force or torque feedback to the controller 18, which may avoid excessive force on the workpiece or the end-effector assembly 16.

With respect to the end-effector assembly 16, this structure may include a master boom 44 and a latticed end-effector array 46. The end-effector array 46 in the depicted embodiments includes one frame rail 48 arranged orthogonally with respect to a longitudinal axis 50 of the master boom 44. It is contemplated, however, that the end-effector array 46 may include more than one frame rail 48. In the depicted embodiment, the frame rail 48 has a substantially cylindrical shape. The end-effector array 46 may also include a plurality of tool branches 52 movably coupled to the frame rail 48. However, the end-effector array 46 may alternatively have only a single tool branch 52. Each tool branch 52 includes a branch rail 54 and a tool module 56 cantilevered from the frame rail 48 and extending radially outward from the frame rail 48. The various branch rails 54 are slidingly and rotatingly attached to the frame rail 48. In other words, the branch rails 54 are movably coupled to the frame rail 48, as will be described in greater detail below. Individual tool modules 56 are suspended from or movably coupled to the branch rails 54. The frame rail 48 is connected, in turn, to the master boom 44 via a mechanical coupling 58.

Figure 2:
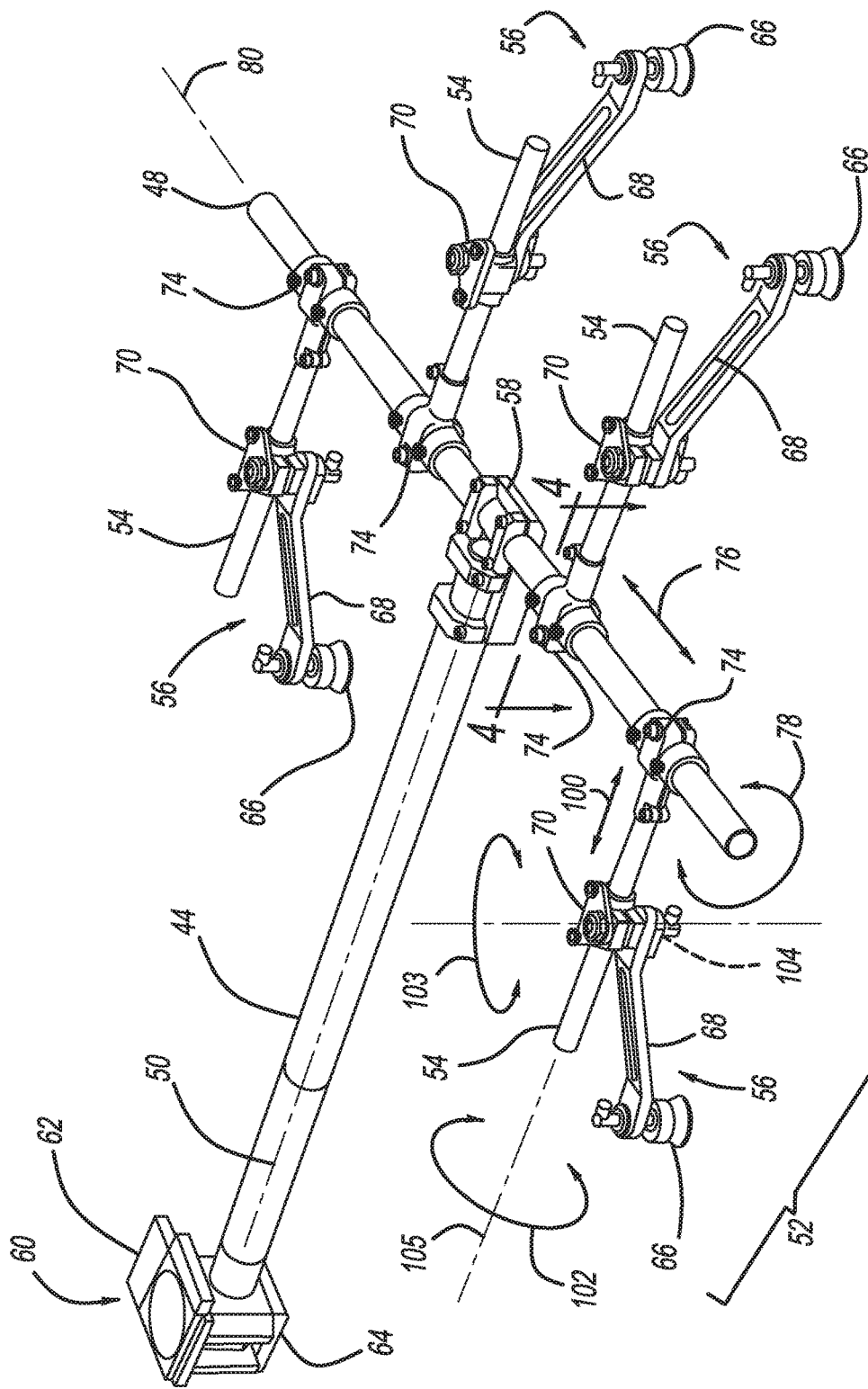
FIG. 2 is a perspective view of the end-effector assembly of FIG. 1.

With reference now to FIG. 2, the master boom 44 may include a double-sided tool changer assembly 60 having opposing tool changers 62, 64. The term "tool changer" refers to manual or automatic assemblies that enable rapid change out of robotic end-effectors. Such devices typically include integrated power and communications ports, connectors, and the like as needed for functioning of an end tool, such as grippers or vacuum suction cups 66. In the depicted embodiment, the tool changer assembly 60 is specially configured to provide simultaneous engagement of the master boom 44 with both the robot 12 and the configuration stand 20, the latter of which is shown schematically in FIG. 1.

For the purposes of the present disclosure, the configuration stand 20 may be fixed with respect to a floor or suspended from a vertical surface such as a machine column or wall. The configuration stand 20 has a predetermined position in a Cartesian (e.g., XYZ) frame of reference, and thus provides a calibrated reference point for zeroing of the robot 12 during reconfiguration of the end-effector assembly 16. For example, when transitioning from a first configuration to another configuration, the robot 12 connects the tool changer 64 to the configuration stand 20 and releases the tool changer 62. As the robot 12 reconfigures the end-effector assembly 16, the locations in free space of each of the locking mechanisms (e.g., branch locking mechanism 74 and swing locking mechanism 70) described below is known to the controller 18 by virtue of the known location in the frame of reference provided by the configuration stand 20. In the event the configuration of the end-effector assembly 16 becomes unknown during an operation (e.g., due to an impact event or power failure), the end-effector assembly 16, while suspended from the configuration stand 20, can be manually set to a calibrated setting in which the positions of the various end tools and locking mechanisms are known, with configuration thereafter commencing from the zeroed setting.

As described below with particular reference to FIGS. 2 and 3, the branch rails 54 with attached tool modules 56 are automatically repositionable by the robot 12 using the configuration tool 14 and instructions executed by the controller 18. Accordingly, the tool branches 52 may be arranged as desired to permit the tool modules 56, or more precisely, the individual end tools 66 of the tool modules 56, to attach to or otherwise interact with a given workpiece. In a non-limiting body panel example, the corresponding end tools 66 as shown in the various figures are configured as pneumatic suction cups or grippers of the type commonly used to secure and move automotive or other body panels without marring cosmetic show surfaces. However, other end tools 66, such as pinchers, clamps, spray nozzles, may be used. Therefore, the particular construction of the end tools 66 may vary. In each tool branch 52, a swing arm 68 is coupled between the end tool 66 and the branch rail 54 by a swing locking mechanism 70, as will be described in greater detail below. The swing arm 68 is obliquely angled relative to the branch rail 54 in order to help the end tool 66 interact with a workpiece.

The end-effector assembly 16 can be reconfigured to interact with workpieces having different sizes, shapes, and/or surface contours relative to each other and other workpieces, and constructed from different materials. For example, a workpiece may be considerably larger and more uniform than another workpiece, thereby requiring different configurations of the same end-effector assembly 16. Any number of possible workpieces may be encountered in a given manufacturing operation, and thus the end-effector assembly 16 is reconfigurable by the robot 12 to operate on any of them individually, as needed.

The controller 18 is made aware of the particular workpiece to be operated on via the input signals (arrow 30 of FIG. 1), such as via manual selection by an operator, detection of an RFID tag, or any other suitable identifying process. The controller 18 then automatically selects a corresponding configuration from its memory 22. After the end-effector assembly 16 has been deposited on the configuration stand 20 via the tool changer 64, the robot 12 then releases the end-effector assembly 16 via the tool changer 62 and moves to attach the configuration tool 14 at a suitable workstation (not shown) to its wrist 42 or other suitable end linkage via another tool changer 142 mounted on the configuration tool 14 (see FIG. 6) so as to configure the end-effector assembly 16. Such a workstation may be embodied as a fixture that allows the configuration tool 14 to be retained at a calibrated position, i.e., a position readily accessible by the wrist 42. All of this occurs while the end-effector assembly 16 remains captive on the configuration stand 20. Furthermore, the present embodiment allows for the end-effector assembly 16 to be configured by the robot 12 without the need for any "flipping" on the configuration stand 20, as the lock/unlock features of the swing lock 70 and the branch lock 74 are accessible from the opposite direction of the end tools 66.

Once the end-effector assembly 16 has been fully configured for the task at hand using the configuration tool 14, the robot 12 automatically deposits the configuration tool 14 to its workstation, detaches the configuration tool 14 from the wrist 42 via releasing the tool changer 142 on the configuration tool 14, moves to pick up the newly configured end-effector assembly 16 by engaging the tool changer 62 and releasing the tool changer 64 at the same time, removes the end-effector assembly 16 from the configuration stand 20, and commences operation on a workpiece. The ability of the robot 12 to reconfigure the end-effector assembly 16, without flipping the end-effector assembly 16, allows for its use across a wide range of possible workpieces and in a variety of different environments, without concern for space limitation. In this way, manufacturing flexibility and efficiency can be enhanced, while reducing tooling costs and system downtime.

Referring to FIG. 2, the end-effector assembly 16 includes at least one frame rail 48 arranged orthogonally with respect to the boom axis 50 of the main boom 44, with the various tool modules 56 connected with respect to the radially-extending branch rails 54. In an example embodiment in which the end tools 66 are pneumatic grippers, pneumatic tubing may be routed along the main boom 44 and directed to the various end tools 66.

Figure 3:
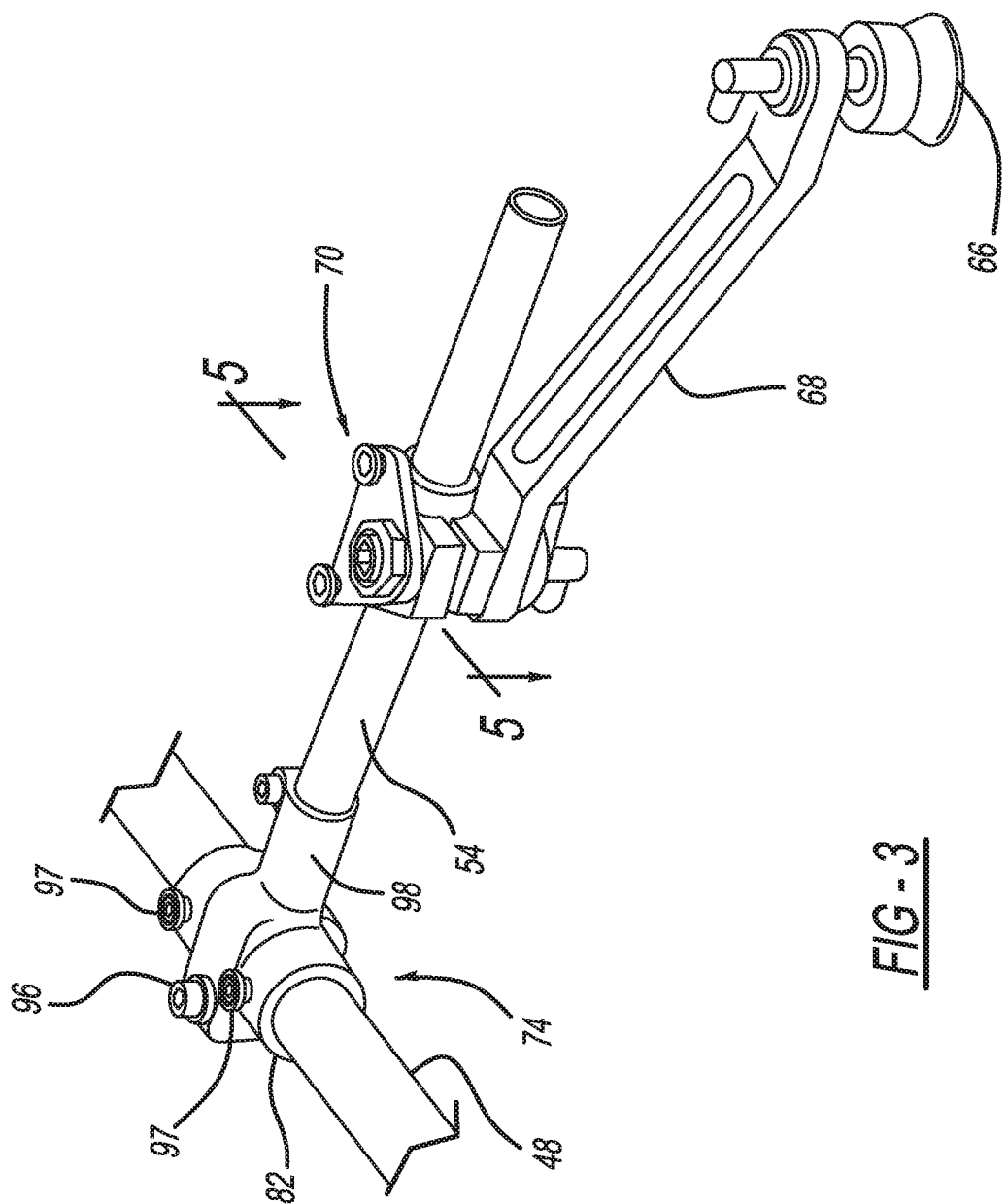
FIG. 3 is a perspective view of a frame rail and a tool branch of the end-effector assembly of FIG. 2.

With reference to FIGS. 2 and 3, each tool branch 52 includes a branch lock 74 coupling the branch rail 54 to the frame rail 48. In the depicted embodiment, the branch lock 74 can move between a locked and an unlocked state. In the locked state, the branch lock 74 fixes the position of the branch rail 54 relative to the frame rail 48 and, therefore, the branch rail 54 remains stationary relative to the frame rail 48. When the branch lock 74 is in the unlocked state, the branch rail 54 can translate along the frame rail 48 in the directions indicated by arrow 76 and can rotate about the frame rail 48 in the directions indicated by arrow 78. In this manner, any number of different configurations of the tool modules 56 may be set by the robot 12 as needed in response to the commands (arrow 32) from the controller 18. Due to its rounded cross-section (e.g., circular cross-section), the frame rail 48 allows the branch lock 74 to rotate about the frame rail axis 80 when the branch lock 74 is in the unlocked state. In addition, the branch lock 74 can slide along the frame rail axis 80 when it is disposed in the unlocked state. As discussed in detail below, the configuration tool 14 can be used to move the branch lock 74 between the locked and unlocked states.

Figure 4:
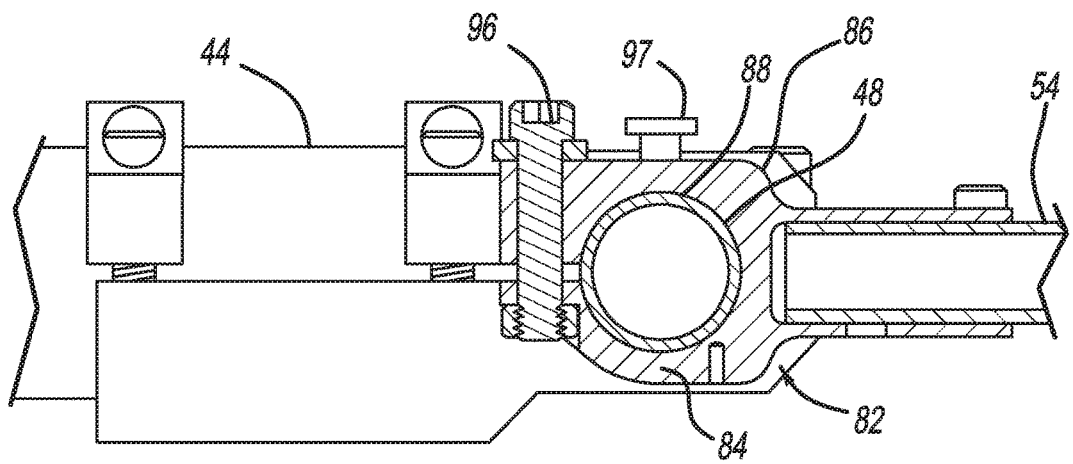
FIG. 4 is a cross-sectional view of the end-effector assembly, taken along section line 4-4 of FIG. 2.

In the depicted embodiment shown in FIGS. 3 and 4, the branch lock 74 includes a clamp 82 for clamping the frame rail 48. The clamp 82 is configured as a wrap-around clamp and includes a clamp base 84 and a clamp arm 86 movably coupled to the clamp base 84. The clamp base 84 and clamp arm 86 define a clamp recess 88 configured, shaped, and sized to receive a portion of the frame rail 48. The clamp recess 88 may have a concave shape in order to allow the frame rail 48 to seat on the clamp base 84.

A fastener 96 can be used to adjust the distance between the clamp base 84 and the clamp arm 86. As non-limiting examples, the fastener 96 may be a screw, a bolt, or any other suitable fastener for moving the clamp arm 86 toward or away from the clamp base 84. In the depicted embodiment, for example, the fastener 96 is a bolt having a head portion arranged outside the clamp arm 86 and a nut arranged outside the clamp base 84. As should be understood, rotating the fastener 96 causes the nut to move the clamp arm 86 towards or away from the clamp base 84, thereby tightening or loosening the clamp 82 with respect to the frame rail 48. Specifically, rotating the fastener 96 in a first rotational direction (e.g., clockwise) locks the clamp 82, and rotating the fastener 96 in an opposite direction (e.g., counterclockwise) unlocks the clamp 82. When the clamp 82 is locked, the branch rail 54 is fixed with respect to the frame rail 48, and therefore, remains stationary relative to the frame rail 48. When the clamp 82 is unlocked, the branch rail 54 can translate and rotate relative to the frame rail 48. The clamp 82 may also be configured as a two-part clamp with one hinge, a double-hinged three-part clamp, or any other suitable clamp design.

The branch lock 74 may further define a plurality of lugs or tabs 97 providing a feature for the configuration tool 14 to engage and adjust the branch lock 74, as will be described in greater detail below. At least one of the tabs 97 may incorporate a centering feature for use in alignment control by the robot 12. The branch lock 74 additionally includes a permanent clamp 98 that holds the branch rail 54 orthogonal relative to the frame rail 48.

With continued reference to FIGS. 2 and 3, each tool branch 52 may also include a swing locking mechanism 70 coupling the branch rail 54 to the swing arm 68. In the depicted embodiment, the swing lock 70 can move between the locked and unlocked states. In the locked state, the swing lock 70 fixes the position of the swing arm 68 relative to the branch rail 54 and, therefore, the swing arm 68 remains stationary relative to the branch rail 54. When the swing lock 70 is in the unlocked state, the swing arm 68 can translate along the branch rail 54 in the directions indicated by arrow 100, can rotate about the branch rail 54 in the directions indicated by arrow 102, and can rotate about a pivot shaft 104 (see FIG. 5) in the directions indicated by arrow 103. In this manner, any number of different configurations of the tool modules 56 may be set by the robot 12 as needed in response to the commands (arrow 32) from the controller 18. Due to its rounded cross-section (e.g., circular cross-section), the branch rail 54 allows the swing lock 70 to rotate about the branch rail axis 105 when the swing lock 70 is in the unlocked state. In addition, the swing lock 70 can slide along the branch rail axis 105 when it is disposed in the unlocked state. As discussed in detail below, the configuration tool 14 can be used to move the swing lock 70 between the locked and unlocked states.

Figure 5:
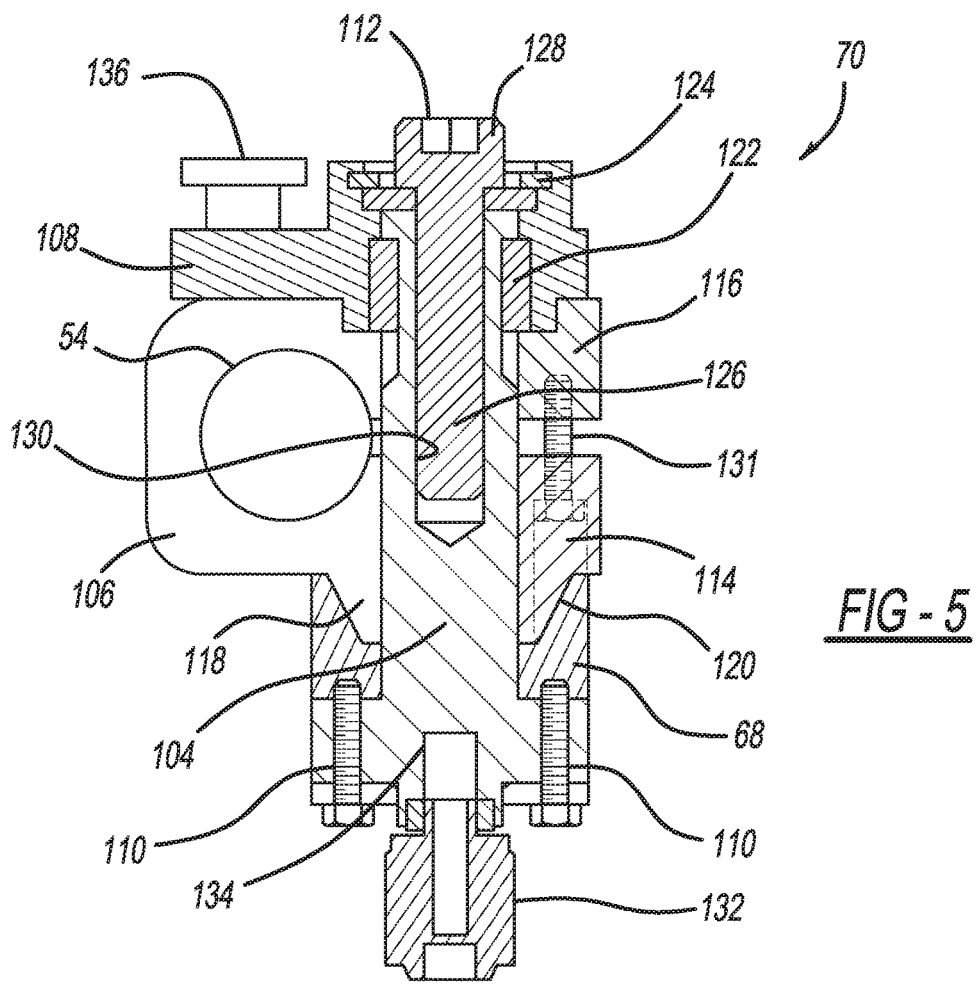
FIG. 5 is a cross-sectional view of the end-effector assembly, taken along section line 5-5 of FIG. 3.

Referring now to FIG. 5, the swing lock 70 includes a wrap-around clamp 106 for clamping the swing arm 68 to the branch rail 54, the pivot shaft 104 for rotationally securing the swing arm 68 to the wrap-around clamp 106, a swing plate 108 for engagement with the configuration tool 14, a joining mechanism 110 for securing the pivot shaft 104 to the swing arm 68, and a locking fastener 112 for tightening and releasing the swing lock 70. In particular, the wrap-around clamp 106 can be clamped and/or loosened on the branch rail 54 by pinching and/or releasing a pair of split flanges (i.e., split flange base 114, split flange arm 116). The wrap-around clamp 106 further includes a frusto-conical wedge 118 protruding from the split flange base 114 toward the swing arm 68. The swing arm 68 defines a corresponding frusto-conical recess 120 configured, shaped, and sized to receive the frusto-conical wedge 118 in order to enhance the clamping force between the wrap-around clamp 106 and the swing arm 68.

The swing arm 68 may be tightened to the wrap-around clamp 106 when in the locked state, but is free to rotate with the pivot shaft 104 fastened via the joining mechanism 110 (e.g., a bolt, screw, dowel pin, weld) when in the unlocked state. To this end, the pivot shaft 104 may extend through openings in the split flange base 114 and split flange arm 116 and terminate at the swing plate 108. The pivot shaft 104 may be keyed to the swing plate 108 via at least one key 122, which secures the pivot shaft 104 to the swing plate 108 rotationally, but not axially.

The locking fastener 112 can movably couple the split flange base 114 to the split flange arm 116. As non-limiting examples, the locking fastener 112 may be a screw, a bolt, or any other suitable fastener including external threads. In the depicted embodiment, for example, the locking fastener 112 is a captured fastener secured within the swing plate 108 via a retaining ring 124. In this way, when unclamping, the locking fastener 112 freely spins, but the pivot shaft 104 may be pushed away axially to separate and cause the locking fastener 112 to push back the configuration tool 14 instead of the frusto-conical wedge and recess 118, 120, which may otherwise remain frictionally wedged together.

The locking fastener 112 further includes a shaft 126 and a head 128 coupled to the shaft 126. The head 128 is arranged to protrude from the swing plate 108, while the shaft 126 is partially disposed in a blind hole 130 extending through the pivot shaft 104. The blind hole 130 of the pivot shaft 104 is internally threaded and is configured, shaped, and sized to mate with an external thread of the shaft 126. As a result, rotating the locking fastener 112 causes the split flange base 114 and the split flange arm 116 to move together or apart, thereby tightening or loosening the wrap-around clamp 106 with respect to the branch rail 54 and the swing arm 68, concurrently. Specifically, rotating the locking fastener 112 in a first rotational direction (e.g., clockwise) threads the locking fastener 112 into the pivot shaft 104 and locks the wrap-around clamp 106, while rotating the locking fastener 112 in an opposite direction (e.g., counterclockwise) unthreads the locking fastener 112 from the pivot shaft 104 and unlocks the wrap-around clamp 106.

During unclamping, frictional forces between the frusto-conical wedge and recess 118, 120 may bind the swing arm 68 to the frusto-conical wedge 118 while the split flange base 114 and the split flange arm 116 continue to move apart. The over-stretch limiter 131, however, prevents this from happening, for example, via a threaded end fastened to a mating threaded hole in the split flange arm 116 and a head loosely held in the axial direction inside a counter bore in the split flange base 114. The axial movement between the split flange base and arm 114, 116 will cause the head of the over-stretch limiter 131 to contact the bottom of the counter bore and stop the separation between the split flange base and arm 114, 116, which in turn redirects the unclamping energy towards separating the frusto-conical wedge and recess 118, 120. In this way, the swing arm 68 can rotate about the axis of the pivot shaft 104, while also translating and rotating about the axis of the branch rail 54 when the swing lock 70 is in the unlocked state.

In addition, a pneumatic fitting 132 may be coupled to the pivot shaft 104 in order to fluidly couple pneumatic tubing to the end tools 66 arranged on the swing arm 68. The pneumatic fitting 132 may be in fluid communication with a fluid passage 134 formed through the pivot shaft 104. The swing plate 108 may further define a plurality of lugs or tabs 136 providing a feature for the configuration tool 14 to engage and adjust the wrap-around clamp 106, as will be described in greater detail below. At least one of the tabs 136 may incorporate a centering feature for use in alignment control by the robot 12.

Figure 6:
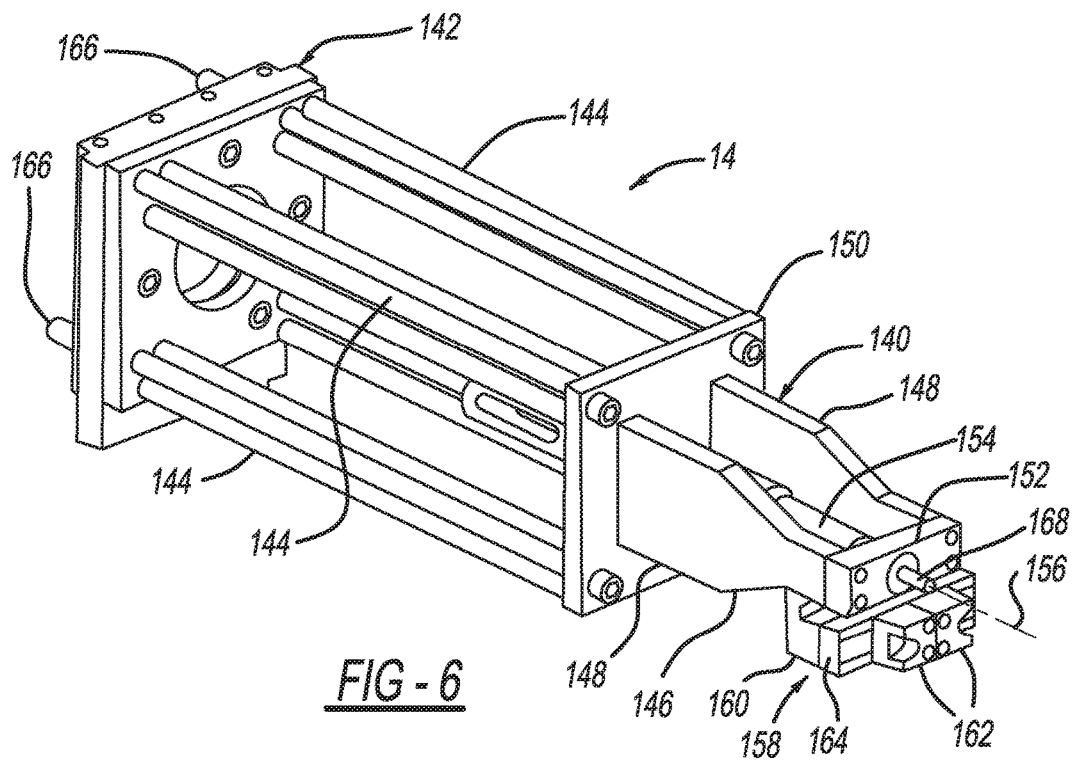
FIG. 6 is a perspective view of a configuration tool usable as part of the robotic system of FIG. 1, with a gripper finger depicted in a disengaged state.
Figure 7:
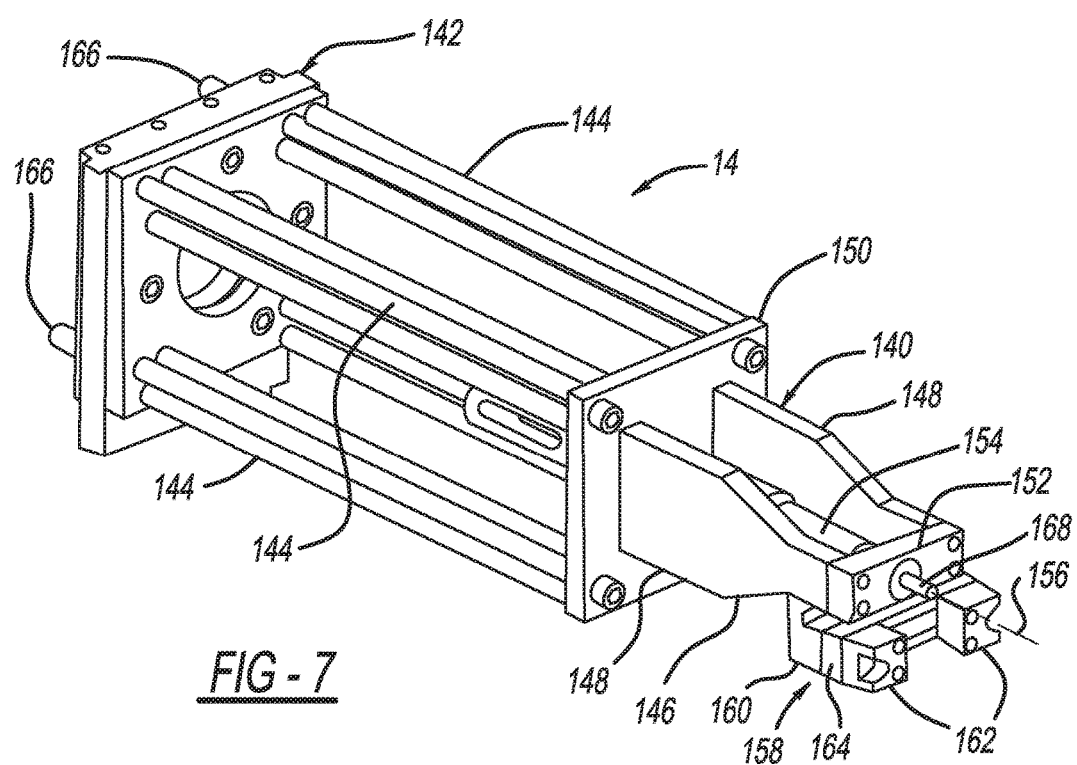
FIG. 7 is a perspective view of the configuration tool usable as part of the robotic system of FIG. 1, with a gripper finger depicted in an engaged state.

With specific reference to FIG. 6 and FIG. 7, the configuration tool 14 includes an axially-extending tool assembly 140 and a tool changer 142 coupled to the tool assembly 140 via axially-extending support rails 144. The tool assembly 140 includes a tool body 146, which may include parallel plates 148 each shaped as a rectangle or another polygon. Each parallel plate 148 is mounted to (and extends from) a first end plate 150 toward a second end plate 152. The first and second end plates 150, 152 are part of the tool body 146 and may be rectangular in shape. The first end plate 150 may be larger in area than the second end plate 152 to facilitate use in configuring the end-effector assembly 16.

A nutrunner 154 can rotate about a nutrunner axis 156 (i.e., bit axis) and extends through the second end plate 152 and is used to adjust the branch lock 74 and the swing lock 70. In the present disclosure, the term "nutrunner" means a powered torque wrench capable of using pneumatic, electric, or hydraulic power to rotate and transmit torque. The nutrunner 154 may be driven with a servo motor and control for precise and consistent rotation.

In addition, the tool assembly 140 includes a gripper 158 coupled to the tool body 146 at a location closer to the second end plate 152 than to the first end plate 150. The gripper 158 is parallel to the nutrunner 154 and includes a gripper actuator 160 and a plurality of gripper fingers 162 movably coupled to the gripper actuator 160. The gripper actuator 160 can be an electric or pneumatic actuator, and the tool changer 142 can channel electricity or pneumatic fluid for controlling the gripper 158 when the configuration tool 14 is mounted to the wrist 42. In the depicted embodiment, the gripper 158 includes two fingers 162. However, the gripper 158 may include more than two fingers 162. Irrespective of the quantity, the gripper fingers 162 can move relative to one another between a first or disengaged position (FIG. 6) and a second or engaged position (FIG. 7). When disposed in the first position (FIG. 6), the gripper fingers 162 are closer to each other than in the second position (FIG. 7). The gripper fingers 162 may be coupled to the gripper actuator 160 via a sliding member 164. The sliding member 164 is coupled to the gripper fingers 162 and can be actuated by the gripper actuator 160 in order to move the gripper fingers 162 between the first and second positions.

The gripper fingers 162 of the gripper 158 are configured to grasp the tabs 97 of the branch lock 74 in order to hold the branch lock 74, thereby allowing the configuration tool 14 to move (translate or rotate) the tool branch 52 relative to the frame rail 48. Similarly, the gripper fingers 162 of the gripper 158 can grasp the tabs 136 of the swing lock 68 in order to hold the swing plate 108, thereby allowing the configuration tool 14 to move (e.g., rotate or translate) the tool module 56 relative to the branch rail 54. In particular, to release the swing lock 68, the configuration tool 14 is robotically commanded to grasp the swing plate 108 on the tabs 136, then the nutrunner 154 turns the locking fastener 112 counter-clockwise to push the pivot shaft 104, and thus the swing arm 68, away from the frusto-conical wedge 118. In turn, this allows the robot 12 to slide and rotate the tool branches 52 around the frame rail 48, as well as to slide and rotate the swing arm 68 in combination for moving the end tools 66 to the desired position. Similarly, to lock the swing lock 68 upon reaching a desired position, and while the configuration tool 14 is still engaged, the nutrunner 154 turns the locking fastener 112 clockwise to pull in the pivot shaft 104 and the swing arm 68 together to thereby engage the frusto-conical wedge 118 and the frusto-conical recess 120. In turn, this pinches the split flanges 114, 116 of the wrap-around clamp 106 over the branch rail 54, thereby securely locking the end-effector assembly 16 into position.

The tool changer 142 of the configuration tool 14 may be any suitable mechanical coupling, similarly to the tool changer 62 on the master boom 44, allowing the robot 12 to pick up the configuration tool 14 and includes guide pins 166 or other suitable coupling devices which enable the robot 12 to engage the configuration tool 14 with the wrist 42. The tool changer 142 may also include electrical and pneumatic ports capable of channeling electric and pneumatic power and control signals to run the nutrunner 154 via a drive motor inside the nutrunner 154. Once coupled to the wrist 42, the configuration tool 14 locks into place and electrical and/or pneumatic power is provided to the nutrunner 154 as needed to rotate the driver bit 168, e.g., a hex-head bit. Thus, actuating the nutrunner 154 causes the driver bit 168 to turn. At least part of the nutrunner 154 extends through the second end plate 152 in a direction away from the first end plate 150, such that the driver bit 168 is outside the tool body 146 and extends beyond the second end plate 152.

Referring to FIG. 8 and FIG. 9, in order to reconfigure the tool branch 52, the configuration tool 14 is manipulated first to engage the nutrunner 154 and its driver bit 168 with the fastener 96 of the branch lock 74 that wraps around on the frame rail 48, while the gripper fingers 162 on the configuration tool 14 remain in the first position (i.e., in the disengaged position) but in a position that is ready to engage with at least one of the tabs 97. Specifically, the robot 12 moves the configuration tool 14 toward the branch lock 74 such that the driver bit 168 is aligned with the fastener 96 and the gripper fingers 162 of the gripper 158 are aligned with at least one of the tabs 97, while the gripper fingers 162 are in the first position (i.e., disengaged state). The configuration tool 14 may be moved toward the branch lock 74 until the driver bit 168 is aligned with the fastener 96 and the gripper fingers 162 are aligned with at least one of the tabs 97. Then, as best shown in FIG. 9, the gripper fingers 162 are then moved to the second position (i.e., engaged state) in order to grasp at least one of the tabs 97. As discussed above, the gripper fingers 162 can be actuated pneumatically or electrically.

Next, the controller 18 electrically commands the nutrunner 154 to engage the driver bit 168 with the fastener 96. The driver bit 168 may rotate (e.g., counter-clockwise) to loosen the fastener 96 and release the branch lock 74 from secure engagement on the frame rail 48. With the gripper fingers 162 of the configuration tool 14 grasping tightly against the at least one of the tabs 97, the robot 12 can slide the branch rail 54 along the frame rail 48, as well as, rotate the branch rail 54 around the frame rail 48 to the desired position or orientation. Afterwards, the nutrunner 154 of the configuration tool 14 is commanded (by the controller 18) to rotate (e.g., clockwise) to tighten the fastener 96 to secure the branch lock 74 in the desired position on the frame rail 48. The controller 18 can also command the gripper fingers 162 to disengage (i.e., move to the first position) in order to release the at least one of the tabs 97 and disengage the configuration tool 14 from the branch lock 74 to complete the reconfiguration operation.

With reference now to FIG. 10 and FIG. 11, in order to configure the swing arm 68 or adjust the position and/or orientation of the end tool 66 (e.g., vacuum gripper), the configuration tool 14 may be manipulated to engage the nutrunner 154 and its driver bit 168 with the locking fastener 112 of the swing lock 70, while the gripper fingers 162 on the configuration tool 14 remain disengaged (i.e., in the first position) but in a position that is ready to engage with the locking fastener 112. Specifically, the robot 12 moves the configuration tool 14 toward the swing lock 70 such that the driver bit 168 is aligned with the locking fastener 112 and the gripper fingers 162 of the gripper 158 are aligned with at least one of the tabs 136, while the gripper fingers 162 are in the first position (i.e., disengaged state). The configuration tool 14 may be moved toward the swing lock 70 until the driver bit 168 is aligned with the head of the locking fastener 112 and the gripper fingers 162 are aligned with at least one of the tabs 136. Then, as best shown in FIG. 11, the gripper fingers 162 are engaged (i.e., moved to the second position) in order to grasp at least one of the tabs 136. As discussed above, the gripper fingers 162 can be actuated pneumatically or electrically.

Next, the controller 18 electrically commands the nutrunner 154 to engage the driver bit 168 with the locking fastener 112. The driver bit 168 may rotate (e.g., counter-clockwise) to loosen or push the locking fastener 112 away from the pivot shaft 104. This action, in turn, allows the frusto-conical wedge 118 to move away from the frusto-conical recess 120, thereby releasing the swing lock 70 from secure engagement on the branch rail 54, while concurrently allowing the swing arm 68 to move with respect to the swing lock 70. With the gripper fingers 162 of the configuration tool 14 grasping tightly on the at least one of the tabs 136, the robot 12 can slide the swing arm 68 along the branch rail 54, as well as, rotate the tool module 56 around the branch rail 54 to the desired position or orientation. Additionally, the robot 12 can also rotate the swing arm 68 and the end tool 66 (e.g., vacuum gripper) around the axis of the pivot shaft 104. Afterwards, the nutrunner 154 of the configuration tool 14 is commanded (via the controller 18) to rotate (e.g., clockwise) to tighten the locking fastener 112 to secure the swing lock 70 in the desired position on the branch rail 54, as well as, to secure the frusto-conical wedge 118 in the frusto-conical recess 120 in order to secure the swing arm 68 in the proper orientation with respect to the swing lock 70. Then, the controller 18 can also command the gripper fingers 162 to disengage (i.e., move to the first position) to release the tabs 136 and disengage the configuration tool 14 from the swing lock 70 to complete the reconfiguration operation.

Figure 12:
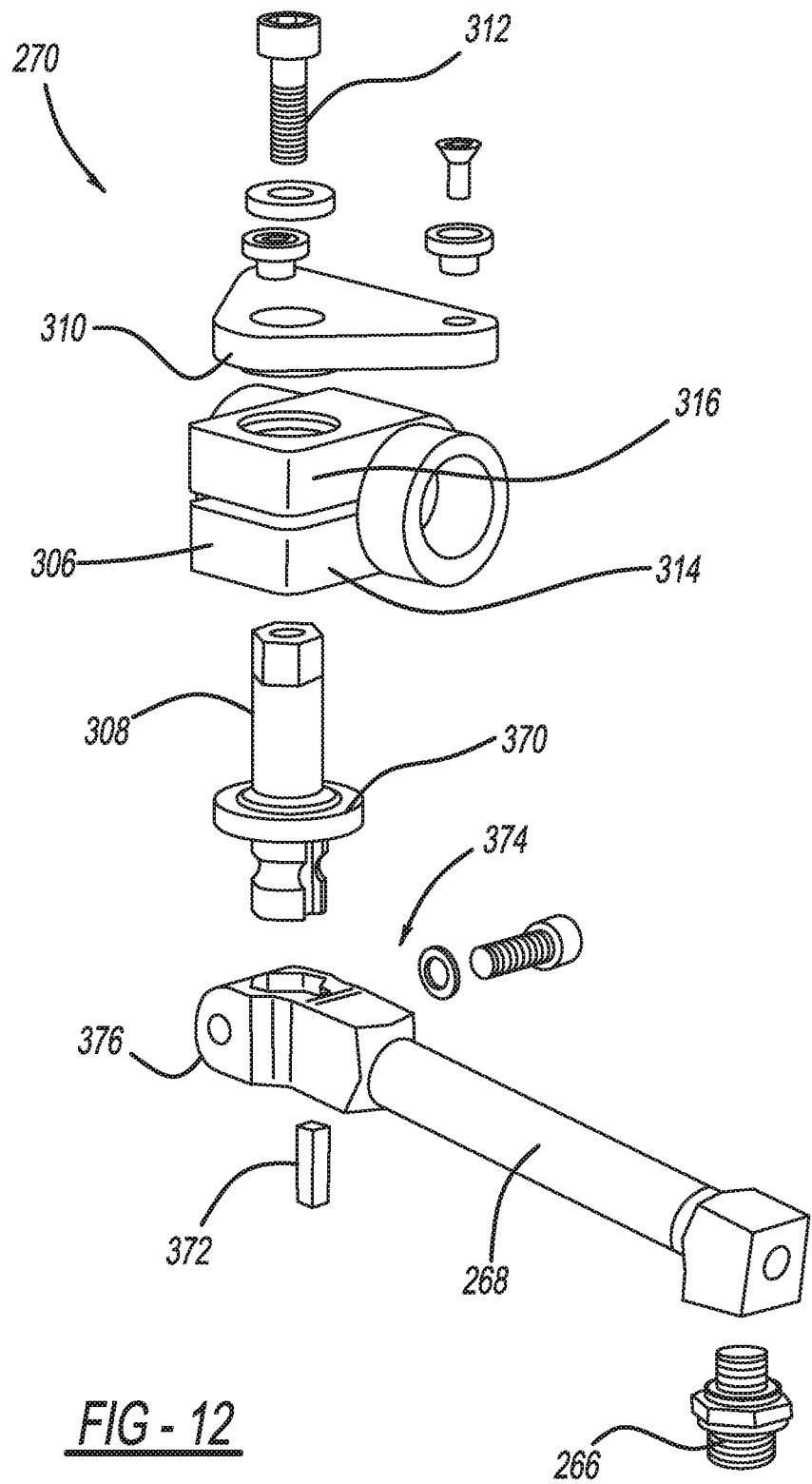
FIG. 12 is an exploded view of an alternative swing lock for the end-effector assembly.

With reference now to FIG. 12, another exemplary swing lock 270 for the reconfigurable end-effector assembly 16 incorporates a wrap-around clamp 306 for clamping a swing arm 268 to the branch rail 54, a pivot shaft 308 for rotationally securing the swing arm 268 to the wrap-around clamp 306, a swing plate 310 for engagement with the configuration tool 14, and a locking fastener 312 for tightening or releasing the swing lock 270. With reference to the drawings, wherein like reference numbers refer to like components, the wrap-around clamp 306 can be clamped and/or loosened on the branch rail 54 by pinching and/or releasing a pair of split flanges of the wrap-around clamp 306 (i.e., split flange base 314, split flange arm 316), as previously described with respect to the swing lock 70. However, rather than utilizing the frusto-conical wedge and recess 118, 120 to enhance the clamping force between the wrap-around clamp 306 and the swing arm 268, the assembly is fixed between the wrap-around clamp 306 and a flange 370 of the pivot shaft 308. The swing arm 268 can be rotationally secured to the pivot shaft 308 through the use of a key 372 and clamp assembly 374 at a distal end 376 of the swing arm 268. In an alternate arrangement, the swing arm 268 may also be arranged within so as to be fixed between the wrap-around clamp 306 and the flange 370 of the pivot shaft 308.

As previously discussed, the swing arm 268 may carry the end tool 266. Furthermore, the swing arm 268 may have a similar locked and unlocked state as the swing arm 68 dictated by the tightening or releasing the locking fastener 312 with respect to the swing plate 310.

Embodiments of the present disclosure are described herein. This description is merely exemplary in nature and, thus, variations that do not depart from the gist of the disclosure are intended to be within the scope of the disclosure. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for various applications. Various combinations and modifications of the features consistent with the teachings of this disclosure, however, could be desired for particular applications or implementations.

What is claimed is:

1. An end-effector assembly comprising:
   a master boom;
   a frame rail coupled to the master boom;
   at least one branch rail movably coupled to the frame rail by a branch lock; and
   a swing arm movably coupled to the at least one branch rail by a swing lock, wherein the swing lock further includes:
      a clamp configured to movably secure the swing arm to the branch rail, wherein the clamp further defines a protrusion on an end face and the swing arm defines a correspondingly-shaped recess, and wherein the protrusion and the recess are matingly joined when the locking fastener is locked;
      a pivot shaft extending through the clamp and the swing arm, the pivot shaft configured to rotationally secure the swing arm to the clamp;
      a swing plate secured to the pivot shaft and configured for engagement with a configuration tool; and
      a locking fastener extending through the swing plate and into the pivot shaft, wherein the locking fastener is configured to lock and unlock the swing lock in position along the branch rail.

2. The end-effector assembly of claim 1, wherein the branch lock is movable relative to the frame rail between an unlocked and a locked state so as to fix the branch rail in position relative to the frame rail.

3. The end-effector assembly of claim 1, wherein the swing lock is rotationally and linearly movable along the branch rail between an unlocked and a locked state so as to fix the swing arm in position relative to the branch rail.

4. The end-effector assembly of claim 1, further comprising an end tool arranged at a distal end of the swing arm, the end tool defining a first side of the end-effector assembly for engagement with a workpiece, wherein the branch lock and the swing lock are configured to be engaged by the configuration tool on a second side of the end-effector assembly opposite the first side.

5. The end-effector assembly of claim 1, further comprising a retaining ring secured within the swing plate and configured to retain the locking fastener therein, wherein the retaining ring traps the locking fastener to assist in releasing the protrusion from the recess.

6. The end-effector assembly of claim 1, wherein the swing lock further comprises at least one over-stretch limiting device.

7. The end-effector assembly of claim 6, wherein the over-stretch limiting device includes at least one over-stretch fastener secured within the clamp for restraining the clamp during unlock of the swing lock.

8. A swing lock assembly for an end-effector, the swing lock assembly comprising:
   a clamp configured to movably secure a swing arm to a branch rail, the clamp including an arm portion and a base portion having a protrusion on an end face thereof, the swing arm having a recess correspondingly shaped with the protrusion;
   a pivot shaft extending through the arm and base portions of the clamp, the pivot shaft configured to rotationally secure the swing arm to the clamp;
   a swing plate arranged on the arm portion of the clamp and keyed to the pivot shaft, the swing plate including at least one tab configured for engagement with a configuration tool;
   a locking fastener extending through the swing plate and into the pivot shaft, the locking fastener configured to lock and unlock the swing lock assembly in position along the branch rail, wherein the protrusion and the recess are matingly joined when the locking fastener is locked; and
   a retaining ring secured within the swing plate and configured to retain the locking fastener therein, wherein the retaining ring traps the locking fastener to assist in releasing the protrusion from the recess.

9. The swing lock assembly of claim 8, wherein the swing lock is rotationally and linearly movable along the branch rail between an unlocked and a locked state so as to fix the swing arm in position relative to the branch rail.

10. The swing lock assembly of claim 8, further comprising an end tool arranged at a distal end of the swing arm, the end tool defining a first side of the end-effector, wherein the swing lock assembly is configured to be engaged by the configuration tool on a second side of the end-effector opposing the first side.

11. The swing lock assembly of claim 8, further comprising at least one over-stretch limiting device having at least one over-stretch fastener secured between the arm portion and the base portion of the clamp for restraining the clamp during unlock of the locking fastener.

12. The swing lock assembly of claim 8, wherein the configuration tool includes:
   a tool body;
   a gripper coupled to the tool body, the gripper including a plurality of gripper fingers movable toward and away from each other, wherein the configuration tool is coupled to the swing lock assembly when the gripper fingers engage the at least one tab; and
   a driver bit extending from the tool body, wherein the driver bit is aligned with the locking fastener when the gripper fingers engage the at least one tab such that rotating the driver bit causes the swing lock assembly to move between the locked and unlocked states.

13. A swing lock assembly for an end-effector, the swing lock assembly comprising:
   a clamp configured to secure a swing arm to a branch rail, the clamp having a first surface and an opposing second surface;
   a pivot shaft extending through the clamp and the swing arm in order to rotationally secure the swing arm to the clamp, the pivot shaft having a flange arranged at the second surface of the clamp, and wherein the pivot shaft is keyed for rotational movement with the swing arm;
   a swing plate arranged on the first surface of the clamp and keyed to the pivot shaft, the swing plate including at least one tab configured for engagement with a configuration tool; and
   a locking fastener extending through the swing plate and into the pivot shaft, the locking fastener configured to move the swing plate and the flange toward each other in order to lock the swing lock assembly in position along the branch rail, and away from each other in order to unlock the swing lock assembly from position along the branch rail.

14. The swing lock assembly of claim 13, wherein the swing lock assembly is rotationally and linearly movable along the branch rail between an unlocked and a locked state so as to fix the swing arm in position relative to the branch rail.

15. The swing lock assembly of claim 13, further comprising an end tool arranged at a distal end of the swing arm, the end tool defining a first side of the end-effector, wherein the swing lock assembly is configured to be engaged by the configuration tool on a second side of the end-effector opposing the first side.

16. The swing lock assembly of claim 13, wherein the configuration tool includes:
   a tool body;
   a gripper coupled to the tool body, the gripper including a plurality of gripper fingers movable toward and away from each other, wherein the configuration tool is coupled to the swing lock assembly when the gripper fingers engage the at least one tab; and
   a driver bit extending from the tool body, wherein the driver bit is aligned with the locking fastener when the gripper fingers engage the at least one tab such that rotating the driver bit causes the swing lock assembly to move between the locked and unlocked states.

17. A robot having an end-effector including the swing lock assembly of claim 13.

\* \* \* \* \*